United States Patent
Tsujino et al.

(10) Patent No.: US 7,664,714 B2
(45) Date of Patent: Feb. 16, 2010

(54) NEURAL NETWORK ELEMENT WITH REINFORCEMENT/ATTENUATION LEARNING

(75) Inventors: Hiroshi Tsujino, Saitama (JP); Nobuaki Miyakawa, Saitama (JP); Gen Matsumoto, Saitama (JP); Ryoji Noyori, legal representative, Nagoya (JP)

(73) Assignees: Honda Motor Co., Ltd., Tokyo (JP); Riken, Saitama (JP)

( * ) Notice: Subject to any disclaimer, the term of this patent is extended or adjusted under 35 U.S.C. 154(b) by 0 days.

(21) Appl. No.: 11/255,895

(22) Filed: Oct. 21, 2005

(65) Prior Publication Data

US 2006/0184465 A1    Aug. 17, 2006

(30) Foreign Application Priority Data

Oct. 21, 2004    (JP) .............................. 2004-307284
Oct. 21, 2004    (JP) .............................. 2004-307318

(51) Int. Cl.
*G06N 3/02*    (2006.01)
(52) U.S. Cl. .......................................... 706/15; 706/45
(58) Field of Classification Search .................... 706/15
See application file for complete search history.

(56) References Cited

U.S. PATENT DOCUMENTS

| 5,113,482 | A | * | 5/1992 | Lynne | .......................... | 706/23 |
| 5,222,195 | A | | 6/1993 | Alkon et al. | | |
| 5,704,016 | A | | 12/1997 | Shigematsu et al. | | |
| 6,169,981 | B1 | * | 1/2001 | Werbos | ........................ | 706/23 |
| 6,532,454 | B1 | * | 3/2003 | Werbos | ........................ | 706/14 |
| 2002/0198854 | A1 | * | 12/2002 | Berenji et al. | .................. | 706/12 |
| 2003/0074338 | A1 | * | 4/2003 | Young et al. | .................... | 706/15 |
| 2003/0149676 | A1 | | 8/2003 | Kasabov | | |
| 2004/0054636 | A1 | * | 3/2004 | Tango-Lowy | ................. | 706/16 |

FOREIGN PATENT DOCUMENTS

| EP | 1016981 A1 | 7/2000 |
| JP | 07-182433 | 7/1995 |
| JP | 2000-035956 | 2/2000 |

OTHER PUBLICATIONS

Gen Matsumoto and Hiroshi Tsujino, Design of a brain computer using the novel principles of output-driven operation and memory-based architecture: in Cognition and Emotion in the Brain (T. Ono, G. Matsumoto, R. Llinas, A. Berthoz, R. Norgen, H. Nishijo, R. Tamura Eds.), Elsevier, ICS1250, 529-546, Dec. 2003.*

Hiroshi Tsujino, Output-driven operation and memory-based architecture principles embedded in a real-world device, Journal of Integrative Neuroscience, 3(2), 133-142, Jun. 2004.*

Gen Matsumoto, Hiroshi Tsujino ("Design of a brain computer using the novel principles of output-driven operation and memory-based architecture" International Congress Series 2003.*

(Continued)

*Primary Examiner*—David R Vincent
*Assistant Examiner*—Lut Wong
(74) *Attorney, Agent, or Firm*—Fenwick & West LLP

(57) ABSTRACT

A neural network element, outputting an output signal in response to a plurality of input signals, comprises a history memory for accumulating and storing the plurality of input signals in a temporal order as history values. It also includes an output module for outputting the output signal when an internal state exceeds a predetermined threshold value, the internal state being based on a sum of the product of a plurality of input signals and corresponding coupling coefficients. The history values depend on change of the internal state. The neural network element is configured to subtract a predetermined value from the internal state immediately after the output module fires and performs learning for reinforcing or attenuating the coupling coefficient according to the history values after the output module fires.

3 Claims, 13 Drawing Sheets

OTHER PUBLICATIONS

Barto, A.G. et al., "Neuronlike Adaptive Elements That Can Solve Difficult Learning Control Problems," IEEE Transactions on Systems, Man and Cybernetics, Sep./Oct. 1983, pp. 834-846, vol. SMC-13, No. 5.

Matsumoto, G. et al., "Design of a Brain Computer Using the Novel Principles of Output-Driven Operation and Memory-Based Architecture" in Cognition and Emotion in the Brain: Selected Topics of the International Symposium on Limbic and Association Cortical Systems (T. Ono, G. Matsumoto, R. Llinas, A. Berthoz, R. Norgren, H. Nishijo, R. Tamura Eds.), held in Toyama, Japan, Oct. 7-12, 2002, International Congress Series No. ICS 1250, 2003, pp. 529-546, Elsevier.

Tsujino, H., "Output-Driven Operation and Memory-Based Architecture Principles Embedded in a Real-World Device," Journal of Integrative Neuroscience, Jun. 2004, pp. 133-142, vol. 3, No. 2, Imperial College Press.

Tsujino, H., "A System Theory for the Brain-Like Computer," presented at the Joint 2$^{nd}$ International Conference on Soft Computing and Intelligent Systems (SCIS) and 5th International Symposium on Advanced Intelligent Systems (ISIS), Sep. 21-24, 2004, Keio University, Yokohama, Japan.

Tsujino, H., "http://www.brainvision.co.jp/genspage/hrj_tsujino.htm," 2003, [online] [Retrieved on Sep. 13, 2007] Retrieved from the Internet <URL: http://www.brainvision.co.jp/genspage/hrj_tsujino.htm>.

Machine translation of JP 2000-035956 A (Feb. 2, 2000; Japan Science & Technology Corp.) into English.

Machine translation of JP 07-182433 A (Jul. 21, 1995; Agency of Ind. Science & Technol.) into English.

European Search Report, EP05023033, Jul. 25, 2006.

European Office Action, EP05023033, Feb. 27, 2007.

Communication Pursuant to Article 94(3) EPC (European Patent Office), European Application No. 05023033.3, Jun. 16, 2009, 4 pages.

* cited by examiner (a) NEURAL NETWORK ELEMENT OF SHIGEMATSU et. al.

(b) TD LEARNING

NEURAL NETWORK ELEMENT WITH REINFORCEMENT/ATTENUATION LEARNING

RELATED APPLICATIONS

This application claims the priority benefit under 35 U.S.C. 119 from Japan Patent Application No. 2004-307284 filed on Oct. 21, 2004, and from Japan Patent Application No. 2004-307318 filed on Oct. 21, 2004.

BACKGROUND OF THE INVENTION

1. Field of the Invention

The present invention relates to a neural network element configured to learn contents of an output signal output in response to an input signal, and to a learning scheme using the neural network element.

2. Description of the Related Art

As a conventional technology of method for learning an input-output relation of a neural network, there are back-propagation, a self-organizing map, Hebb learning, TD (temporal differential) learning, or the like. These learning methods enable a neural network element (neuron), which is a component of the neural network, to learn the correspondence between an output and its relevant input pattern. However, in many cases, learning process such as updating a coupling coefficient between the elements depends on whether or not the input and output at the present moment fire at the same time, and the past historical information was not reflected to the learning. In other words, most of conventional methods are not theoretically supported with regard to learning of temporal information process. It is the TD learning only, which meet the learning of the temporal information. In the aforesaid methods (with regard to the TD learning, refer to A. G. Barto et al., "Neuronlike Adaptive Elements That Can Solve Difficult Learning Control Problems", IEEE Transactions on Systems, Man and Cybernetics, Vol. SMC-13, No. 5, pp. 834-846, 1983, for example).

However, the TD learning has a problem that this takes a long time for learning. A concept of eligibility is introduced to the TD learning for acquiring the temporal information. Since the eligibility, which is like a history of input signals, depends on the simultaneous events of the input signal and the output signal, new history is not stored unless the input exists at timing that the neural network element fires. In other words, the eligibility is imperfect as the temporal information of the input signal; for example, a long-term firing process or the like is not stored. Since an update formula of the coupling coefficient depends on both of a reinforcement signal and the eligibility, the coupling coefficient is reinforced only by the reinforcement signal if only there was firing synchronous with the input in the past, even if there is not actual fire at that moment. For these reasons, a lot of learning steps are needed at the beginning of the learning.

Shigematsu et al. suggest a neural network element capable of learning the temporal information (see Japanese Patent Application Publication (JP-B) No. 7-109609). In this model, temporal information of the input is stored in the history, irrespective of the firing of the output. Since coupling weight is updated only at the moment of firing, this model is characterized in learning efficiency thereof.

However, since the learning of the temporal information depends only on the history of the input and the output in the neuron network model of Shigematsu et al., this cannot control a direction of the learning, when used in a system. In addition, there was a defect in which information learning process on a course of temporal direction ambiguously progresses because temporal information history depends only on the input and an attenuation coefficient of the history. There is a problem that the learning method of the model of Shigematsu et al. cannot be applied to the reinforcement learning which is the mainstream of a learning control scheme dealing with the temporal information.

Meanwhile, learning for generating a desired output signal from the input signal is roughly classified into two categories; a "supervised learning" and a "unsupervised learning". The "supervised learning" is a method to advance the learning of the system by giving a desirable output signal to the input signal as a teacher signal, including the back-propagation method or the like. The "unsupervised" learning is a method to perform the learning by using only the input signal. The system learns to generate a similar output signal as the signal used in the learning or the signal similar to the same when these are input.

When a learning control system is operated in an actual environment, it is difficult to give an appropriate teacher signal to the input signal in advance. This is because a prior definition is complicated because of a complexity and non-linearity of an input-output relationship. Therefore, an unsupervised learning is suitable in the use of the learning control system in the actual environment. The reinforcement learning to advance the learning based on reward acquired as a result of its own action of the system has been widely used, because of efficacy thereof in which the learning direction can be controlled by a manner of giving of the reward.

In the reinforcement learning, the system itself may exploratory act to advance the learning in the direction to acquire more reward. Conversely, however, since the learning depends on the reward acquired as a result of exploration, the reinforcement learning tends to fall into local minimum. That is, the reinforcement learning is effective in a domain relatively simple, but when a variation of the input and output increases, it is highly possible that the learning cannot be converged toward the best direction.

Doya et al. suggest architecture to add a state predictor to a plurality of Actor-Critics by improving Actor-Critic architecture, which is a method of the reinforcement learning (see Japanese Patent Application Laid-Open (JP-A) No. 2000-35956). The learning is performed to predict any possible circumstance by the state predictor, and to choose the optimal action according to the predicted state. Further by calculating levels of responsibility of the plurality of Actor-Critics and using the same in the learning, a range of action was expanded to solve the local minimum problem.

SUMMARY OF THE INVENTION

A neural network element capable of temporal information learning and of learning in a short time is desired to replace the conventional reinforcement learning such as the TD learning. An object of the present invention is to provide a neural network element capable of controlling a learning direction according to action of a system and of learning more strongly a context of event to be learned when used in the system, and a learning device using the same.

While the method of Doya et al. makes the unsupervised learning have nonlinearity on the output, this cannot solve problems regarding variation of the input and the nonlinear output related to the same. Since the learning progresses based on a minimization of a prediction error in an environment prediction and the reinforcement learning is controlled based on the prediction error, this is not effective in a domain in which the number of experiment (the number of learning)

is not large. It is preferable that there is provided a learning control system in which a prediction performance is higher than a conventional system, and learning is faster than a convention system and the system applicable also to a real-time control of a more complex domain. An object of the present invention is to provide such learning control system.

According to an aspect of the present invention, a neural network element, outputting an output signal in response to a plurality of input signals, comprises a history memory for accumulating and storing the plurality of input signals in temporal order as history values. It also includes an output module for outputting the output signal when an internal state exceeds a predetermined threshold, the internal state being based on the sum of product of a plurality of input signals and corresponding coupling coefficients. The history values depend on change of the internal state. The neural network element is configured to subtract a predetermined value from the internal state immediately after the output module fires and to perform learning by reinforcing or attenuating the coupling coefficient according to the history values after the output module fires.

As temporal information of the input signal is accumulated in the history irrespective of the firing and the history is changed according to the internal state, learning has a direction. In other words, the history can hardly be stored when the internal state is low, and storing is reinforced as the internal state is close to a firing threshold, the history is stored with the direction of the learning.

Further, by subtracting the predetermined value from the internal state immediately after the firing of the neural network element, the history is largely reduced indirectly after the firing, thereby further defining a contrast of the history value before and after the firing, and the information having more temporal directionality is stored as the history.

According to another aspect of the invention, the history values depend also on a reinforcement signal conveying information from the overall system. The history can be changed by the reinforcement signal, enabling a learning control depending on the system performance.

Reinforcement learning can be performed by combining a plurality of the neural network elements provided in the present invention.

In addition, the present invention provides an action learning control device capable of learning an input-output relationship according to own action of the device. The action learning control device comprises a sensor for obtaining information from an external environment. It also includes a sensory evaluation module for judging whether a state of a subject to be controlled is stable or not using the information from the sensor. The sensory evaluation module outputs a reinforcement signal according to a judged result. The device also includes a sensor information state separating module for performing reinforcement learning based on the reinforcement signal given from the sensor information and classifying the sensor information into low dimensioned states by giving heavier weight to the sensor information having higher sensory evaluation. The device also includes an action learning module for learning a relationship between the state given from the sensor information state separating module and corresponding action control command, and outputting action control command. By introducing the reinforcement learning to the sensor information state separating module, state classification can be made in a short time.

According to an embodiment of the present invention, the action learning control device further comprises an attention controller for sending an action policy to the sensor information state separating module and the sensory evaluation module to promote achievement of an action target based on the action target of the system. The action policy adjusts a separation process of the states at the sensor information state separating module and adjusts reinforcement signal generation at the sensory evaluation module. By introducing the attention controller, appropriate rules on the action policy can be given, and the learning direction is stabilized, so that high-speed learning is expected. Further, by giving the action policy to the sensor information state separating module and the sensory evaluation module, desirable state separation and desirable generation of the reinforcement signal can be obtained in a short time, so that the high-speed learning is expected.

In an embodiment of the present invention, the action learning control device further comprises an action sequence storing and refining module for outputting the action control command from the temporal information when the sensor information and the action control command are received and checked against stored temporal information. Hereby, a state and an action easy to contribute to reward are stored, thereby enabling an easier selection of appropriate action when a similar state occurs again, so that high-level prediction is expected.

In addition, in an embodiment of the present invention, the sensory evaluation module outputs a command to inhibit an output from the system when the module judges a state of the target to be controlled is unstable. Thereby, redundant learning easy to occur in the beginning of the learning can be eliminated, so that the high-speed learning is expected.

DETAILED DESCRIPTION OF THE PREFERRED EMBODIMENTS

1. A Neural Network Element

1.1 Configuration

Figure 1:
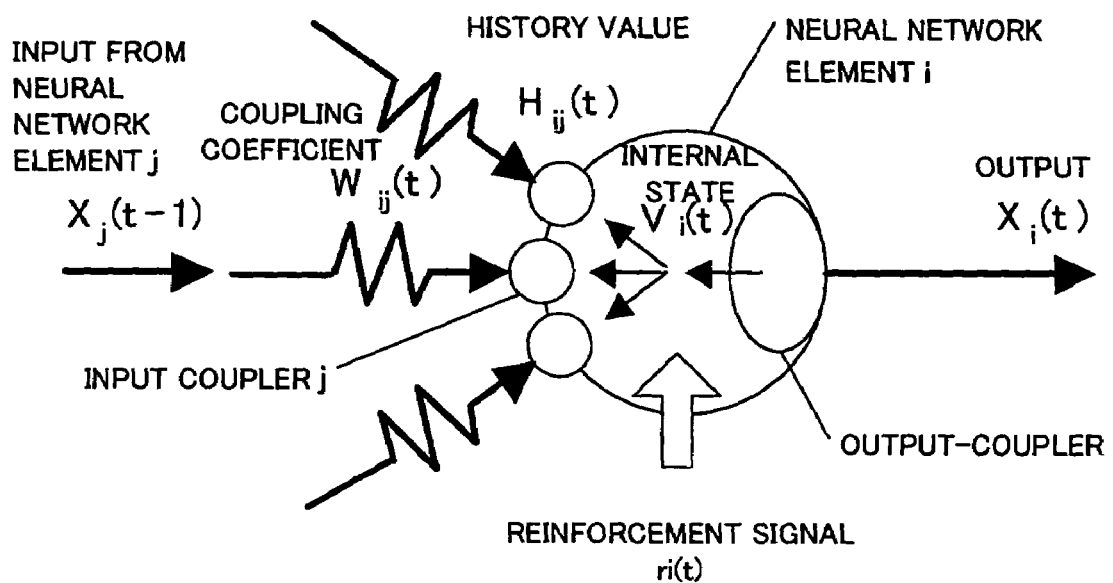
FIG. 1 is a schematic view showing a neural network element according to an embodiment of the present invention.

FIG. 1 is a schematic view showing a neural network element (neuron) 10 according to an embodiment of the present invention. The neural network element 10 is formed by, for example, programming a general-purpose computer. An analog circuit or a digital circuit can also form the neural network element 10. In FIG. 1, an optional neural network element i out of the neural network elements 10 performs action based on an input signal Xj (t−1) received from each of a plurality of (three, in FIG. 1) neural network elements j. The input signals Xj (t−1) received through an input coupler j interposed between the neural network elements i and j are multiplied by an coupling coefficient Wij (t), and are stored within the element, and an internal state Vi (t) is calculated. Herein, the coupling coefficient Wij (t), which is a variable depending on an action history and a firing condition of the neural network element, represents a coupling efficiency between the neural network elements. Next, an output signal Xi (t) is decided at an output-coupler based on an actual internal state Vi (t). In addition, the input and the internal state are back-propagated to update a history value Hij(t) and the coupling coefficient Wij(t). Herein, the history Hij (t) represents temporal information of the input signal Xj up to the time t.

Figure 2:
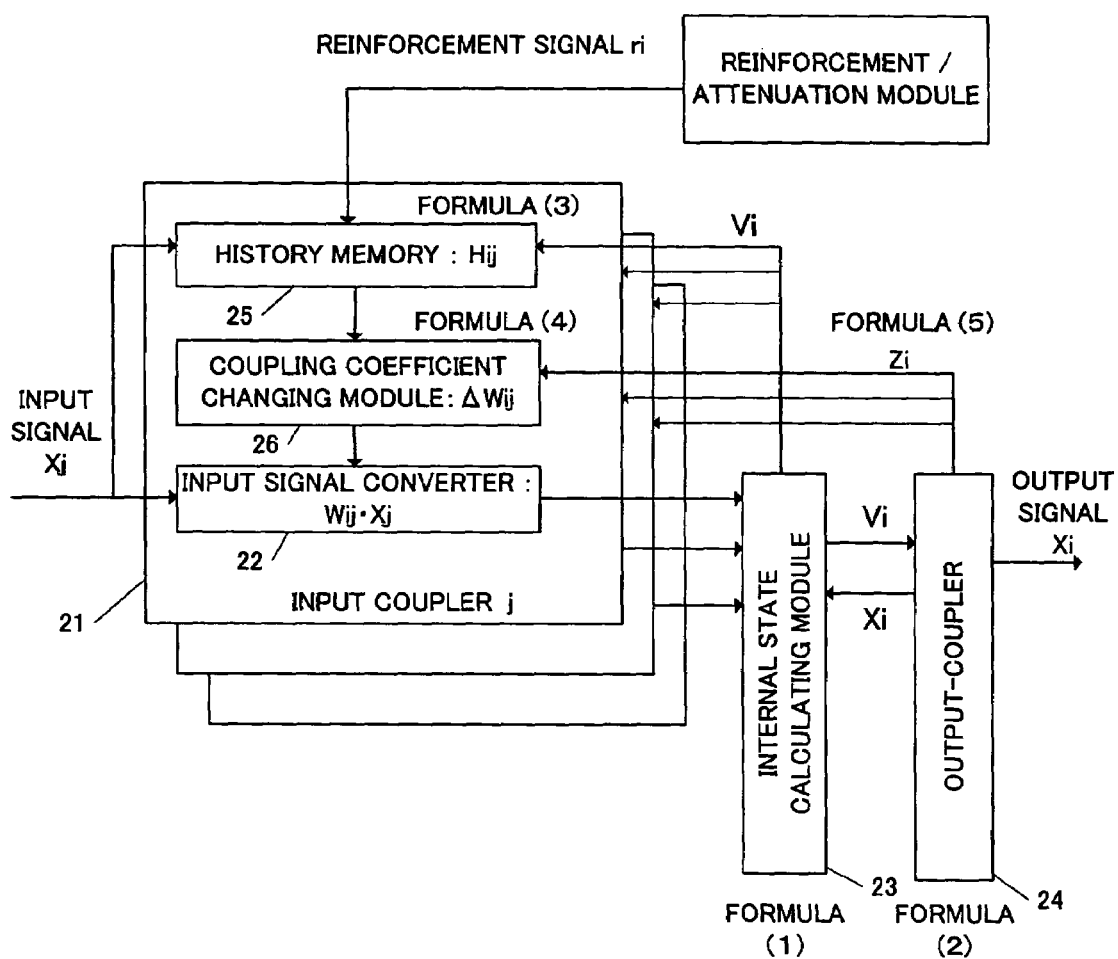
FIG. 2 is a block diagram showing a function of the neural network element of FIG. 1 in detail.

FIG. 2 is a block diagram showing the neural network element i in further detail. Hereinafter, a function of the neural network element i will be described with reference to FIG. 2.

Each of the input signals Xj (t−1) received through a plurality of the input couplers 21 is multiplied by the coupling coefficient at an input signal converter 22, and is stored with other input signals within an internal state calculating module 23. Then, an attenuation value pVi (t−1) of the internal state is taken over from the past as a residual value, and is added to stored input, then the actual internal state Vi (t) is obtained. The internal state Vi (t) is represented by the following formula:

$$V_i(t) = \begin{cases} p \cdot V_i(t-1) + \sum_j W_{ij}(t) X_j(t-1) & \text{if } X_i(t-1) = 0 \\ V_0 - \delta & \text{otherwise} \end{cases} \quad (1)$$

Herein, p represents a constant to decide an attenuation speed of the internal state Vi, and satisfies 0<p<1. While the internal state Vi is decided based on the input signal and the past internal state in general, but immediately after firing (Xi (t−1=1)) of the neural network element i, the state is forcedly set to a value lower than a resting state $V_0$ by a predetermined value δ. This process is performed to further clarify the temporal information of the element, and this will be described in detail later.

The output signal Xi(t) of the neural network element i is decided based on the actual internal state Vi. In this embodiment, the input signal Xj(t−1) and the output signal Xi(t) are set to a digital pulse (0 or 1). When the internal state Vi is larger than a predetermined threshold θ, the neural network element i fires and outputs the pulse (Xi(t)=1). When the state is smaller than the threshold, the element does not output the pulse (Xi(t)=0). The output Xi(t) of the neural network element i is represented by the following formula.

$$X_i(t) = \begin{cases} 1 & \text{if } V_i > \theta \\ 0 & \text{otherwise} \end{cases} \quad (2)$$

A neural network can be configured by combining a plurality of the above-described neural network elements i. Each of the neural network elements is realized by the analog circuit, the digital circuit, and software. This is also capable of addressing continuous information by setting the input and output signals to an analog value (pulse frequency, for example).

Next, a temporal learning method of the neural network element 10 will be described. With reference to FIG. 2, the output signal Xi(t) of the neural network element i is decided at an output-coupler 24, and information of the actual internal state Vi(t) is sent to a history memory 25 of each of the input coupler 21 to update the history value Hij(t) regarding the coupled neural network element j. The present invention is capable of further defining a contrast of temporal variation of a synapse history before and after firing, by making a change of the history values Hij(t) depend on the internal state Vi of the neural network element i. Further, by making the history values Hij(t) depend also on a reinforcement signal ri(t), it becomes possible to control a direction of learning. The history value Hij(t) of the input from the neural network element j at the neural network element i is represented by the following formula:

$$H_{ij}(t) = (1-\lambda) \cdot r_i(t) \cdot V_i(t) \cdot X_j(t-1) + \lambda \cdot H_{ij}(t-1) \quad (3)$$

Herein, λ represents a parameter (attenuation coefficient) which decides proportion of the right first term to the right second term, and λ satisfies 0<λ<1. The right first term represents that the history is updated by the product of the reinforcement signal ri(t), the internal state Vi(t), and the input signal Xj(t−1) from the neural network elements j. The right second term represents that the history value Hij(t−1) in the past is attenuated by the attenuation coefficient λ and is stored. By defining the history value as described above, it becomes possible to represent that information of the firing of the neural network element j coupled to the neural network element i is added to the history. Further, since the history value Hij(t) is stored irrespective of the own firing of the neural network element i, a longer-term firing process can be stored.

Next, the history value Hij(t) is sent to a coupling coefficient changing module 26, and the coupling coefficient Wij is updated based on the history value Hij(t) including the temporal information. A changing component ΔWij(t) of the coupling coefficient is represented by the following formula:

$$\Delta W_{ij}(t) = \alpha (H_{ij}(t) - H_{i0}) Z_i(t) \quad (4)$$

Herein, α represents a constant (learning rate) representing a progression speed of learning, and α satisfies 0<α<1. $H_{i0}$ represents a threshold deciding the learning direction. When the history value Hij(t) is larger than the threshold $H_{i0}$, the coupling coefficient Wij between the neural network element i and the neural network element j is reinforced, and when the value is smaller than the threshold, the coefficient Wij is attenuated. Zi(t) represents a function depending on the firing of the neural network element i, and is a coefficient to execute the learning, a predetermined time τ after the firing. Zi(t) is represented by the following formula:

$$Z_i(t) = \begin{cases} 1 & \text{if } X_i(t-\tau) = 1 \\ 0 & \text{otherwise} \end{cases} \quad (5)$$

The formulae 4 and 5 represent that the coupling coefficient Wij between the neural network elements i and j is updated based on the history value Hij at the moment, the time τ(msec) after the firing of the neural network element i. It has been found that there is a delay of about 30 (msec) in organic neural learning. In an embodiment of the present invention, update is performed with delay of a predetermined time τ so that a flexible and effective learning can be done as in the organic neural learning. A value of τ may be set to a minute value larger than 0, and may be properly set according to conditions such as an intended use of the neural network element and a characteristic of a target to be controlled.

Figure 3A:
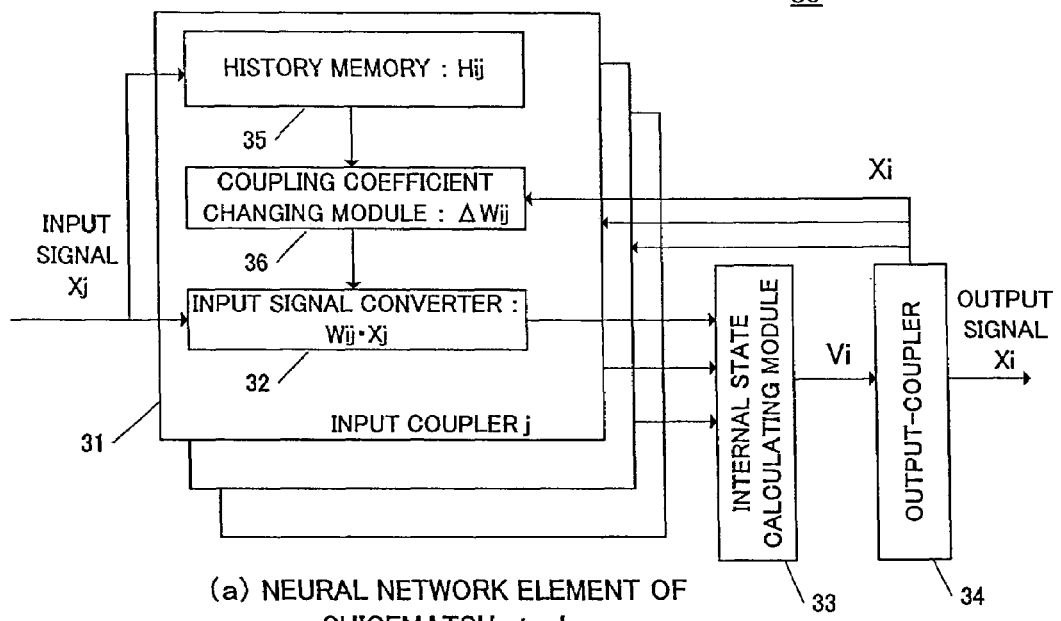
FIGS. 3A and 3B are a block diagrams corresponding to that of FIG. 2 showing a neural network element and TD learning, respectively according to a conventional art of Shigematsu et al.
Figure 3B:
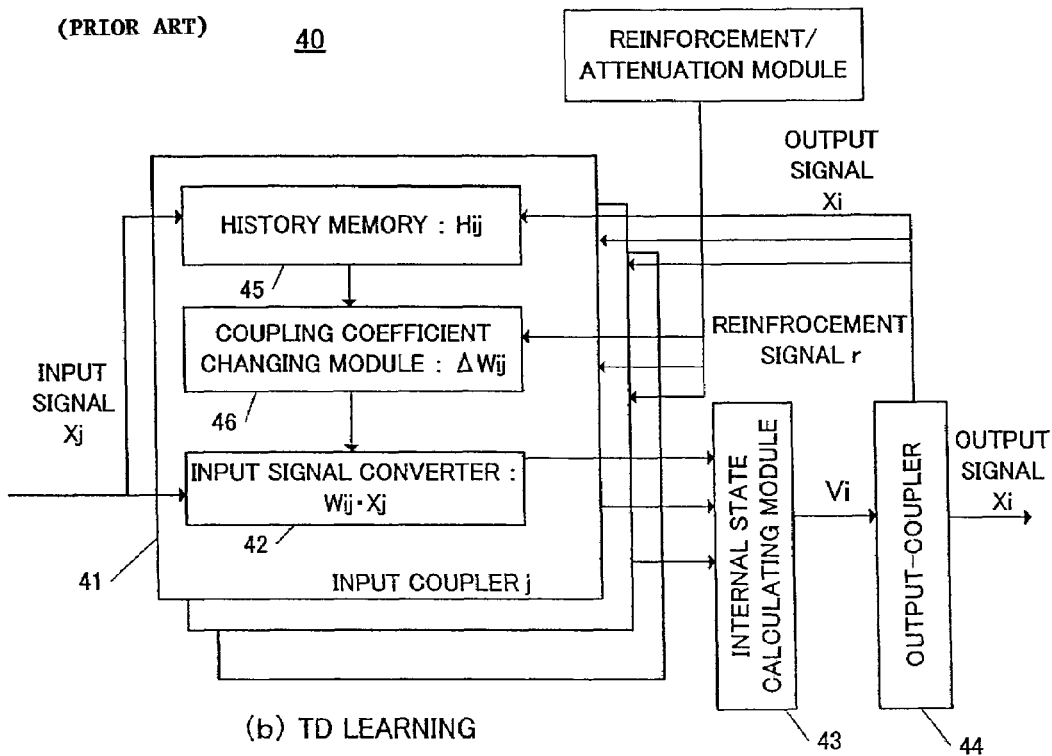

Here, difference between a conventional art and the present invention is described. FIG. 3A is a block diagram showing a conventional neural network element 30 of Shigematsu et al. (JP-A No. 7-109609), and FIG. 3B is a block diagram showing a conventional TD learning method 40. An information flow of each of them is shown correspondingly to the block diagram (FIG. 2) of the present invention.

As shown in FIG. 3A, in the neural network element 30 of Shigematsu et al. (JP-A No. 7-109609), the history value Hij depends only on the input signal Xj and the attenuation coefficient (see a history memory 35). On the other hand, in the present invention, as represented in the formula 3, the history value is updated depending on the input signal Xj, the internal state Vi, the reinforcement signal ri, and the attenuation coefficient λ (see a history memory 25 in FIG. 2). Thereby, increase and decrease of the reinforcement signal and the internal state are reflected in the history, and it becomes possible to indirectly control the learning direction.

Further, as shown in FIG. 3B, since the eligibility corresponding to the history value Hij of the present invention depends on both the input signal Xj and the output signal Xi (see a history memory 45) in the TD learning, information of the input signal is not stored as a history, unless the output occurs. Since the update of the history value Hij does not depends on the output signal Xi in the present invention, the present invention is capable of storing the long-term firing process as a history.

Since the update of the coupling coefficient Wij depends on the reinforcement signal r and the eligibility (the history value) Hij in the TD learning (see the coupling coefficient changing module 46), the coupling coefficient Wij is updated only by synchronous firing in the past, even if there is not the actual firing of the input and output signals. In view of the learning of the neural network element, since the learning advances even in a low-important state, it is highly possible that a delay of learning will occur.

In the present invention, while the history value Hij is used to update the coupling coefficient Wij as in the TD learning, the coupling coefficient Wij is not updated only when the neural network element fires because a function Zi (Formula 5) depending on the output signal Xi is also used. Therefore, the present invention is capable of converging the learning at a higher speed than that in the TD learning.

Figure 4:
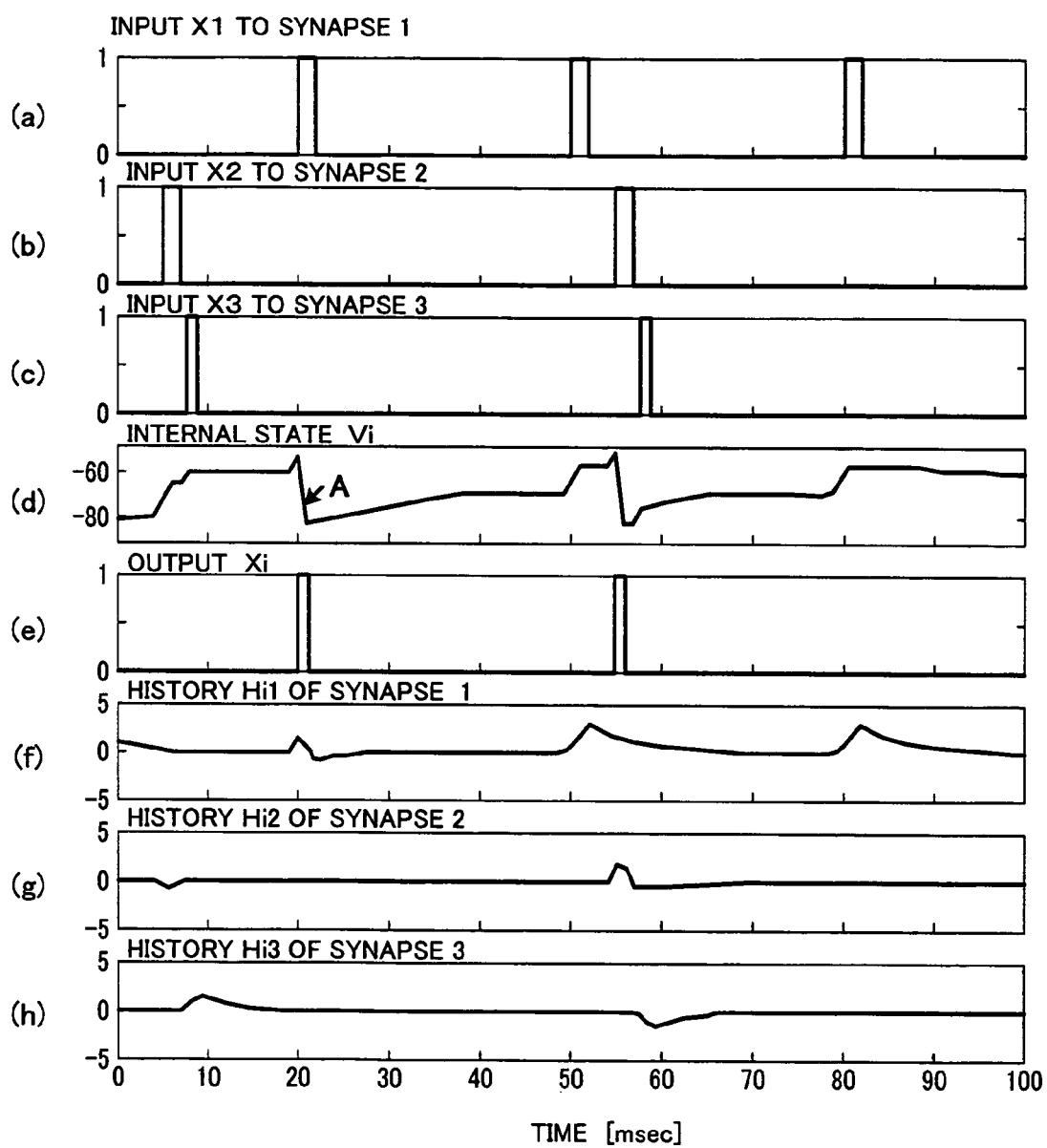
FIG. 4, (a) to (h) are charts each showing a simulation result of action of the neural network element of the present invention.

In FIG. 4, (a) to (h) are charts each showing a simulation result of action of the neural network element of the present invention. FIG. 4, (a) to (c) show pulse input lines $X_1$ to $X_3$ from other coupled neural network elements 1 to 3, respectively, at the neural network device i. FIG. 4 (d) shows the internal state Vi of the neural network element i, and FIG. 4 (e) shows the output Xi of the neural network element i. In FIG. 4, (f) to (h) show history values $H_{i1}$ to $H_{i3}$ at the neural network elements 1 to 3, respectively. By paying attention to the internal state Vi (d) and to the output Xi (e), it is seen that the internal state Vi significantly lowers when the neural network element i fires (see A in FIG. 4(d)). On the other hand, the internal state Vi does not lower in a condition in which the neural network element i does not fires, and is gradually stored up to a firing threshold according to the formula 1. As mentioned above, since the contrast of the internal state Vi before and after firing is defined by a process in which the predetermined value (δ) is subtracted at the moment of the input firing by the formula 1, contrast of the history values $H_{i1}$, $H_{i2}$ and $H_{i3}$ before and after firing are also defined. In consequence, it becomes possible to store the information having a temporal direction, which is stronger than those of the conventional method as a history (see FIG. 4 (f) to (h)).

Figure 5:
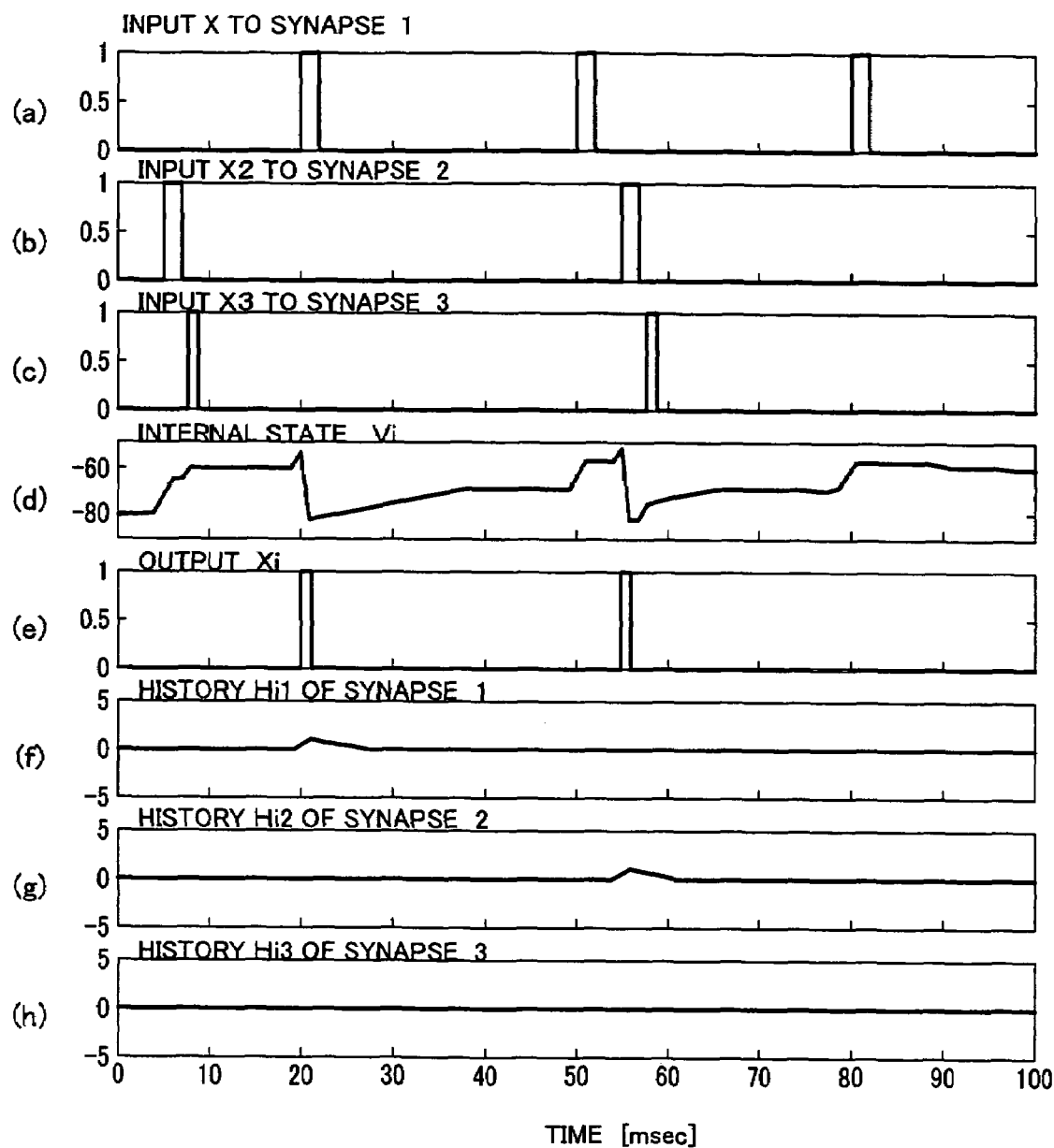
FIG. 5, (a) to (h) are charts each showing a simulation result of TD learning in the same condition as the simulation in FIG. 4, (a) to (h)

In FIG. 5, (a) to (h) are charts each showing a simulation result of action of the neural network element of the TD learning given the same structure and input signal as in the simulation in FIG. 4, (a) to (h). In the TD learning, since the history is updated by using Hebb method in which the update is performed only when the input and output fire at the same moment, history storage capability is weak with regard to the input lines $X_1$, $X_2$ and $X_3$ less frequently fire, and change of the coupling coefficient Wij by the input is also weak. In regard of the contrast before and after firing of the neural network element i, while the internal state Vi appears clearly (see FIG. 5(d)), variation of the history values $H_{i1}$, $H_{i2}$ and $H_{i3}$ are recognized to be weak as compared to that of the present invention (see FIG. 5, (f) to (h)).

FIG. 4, (a) to (h) and FIG. 5, (a) to (h) show that the present invention is capable of storing temporal information which is more definite than that of the TD learning in the history. Further, since the update of the coupling coefficient Wij becomes larger by using the history values $H_{i1}$, $H_{i2}$ and $H_{i3}$, it is possible to realize a high-speed learning.

1.2 Application to the Reinforcement Learning

Next, a motor control system of a radio-controlled helicopter applying the above-described neural network element 10 will be described as another embodiment of the present invention.

Figure 6:
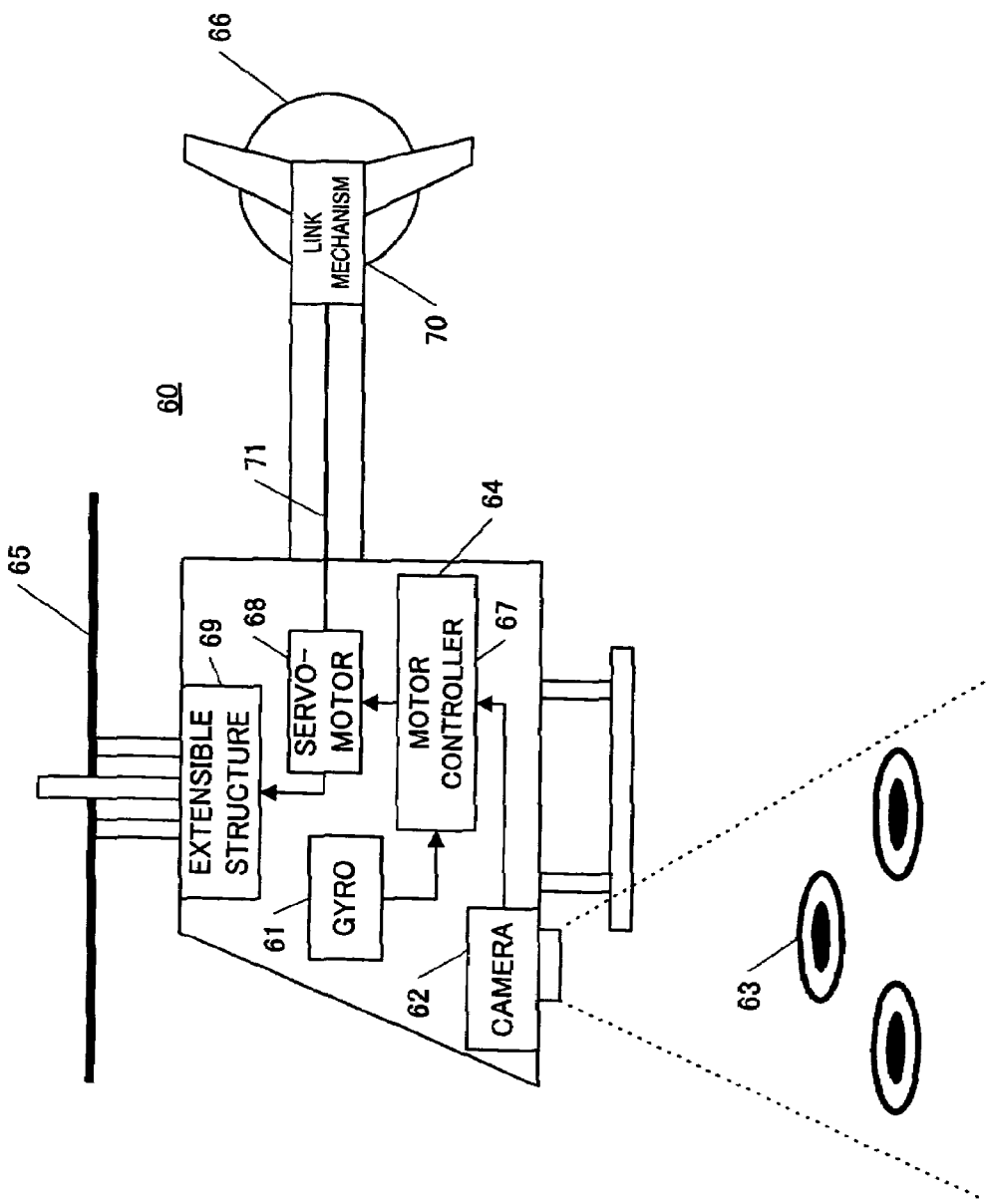
FIG. 6 is a block diagram showing a helicopter control system according to another embodiment of the present invention.

FIG. 6 is a view showing an example of a structure of the system. The system controls an automatic flight of a helicopter 60 such as hovering based on positional information of a target 63 obtained by a camera 62 and pose information of an body 64 obtained by a gyro 61.

The helicopter 60, which is a controlled object, comprises the body 64, a main rotor 65, and a tail rotor 66. The helicopter 60 levitates by rotation of the main rotor 65 and the tail rotor 66.

The gyro 61, the camera 62, a motor controller 67, and a servomotor 68 are mounted to the body 64. The gyro 61 detects a pitch angle, a yaw angle, and a role angle of the body 64, and the camera 62 provides an image of the target 63, which is a marker of the automatic flight of the helicopter 60. The information from the gyro 61 and the camera 62 are input to the motor controller 67. Further, an extensible structure 69 and a linkage 70 are provided on a base portion of the main rotor 65 and that of the tail rotor 66, respectively, which are connected to the servomotor 68 by a rod 71 or the like. When an output from the servomotor 68 changes according to a command value from the motor controller 67, tilt of the main rotor 65 and of the tail rotor 66 also change by the extensible structure 69 and the linkage 70, respectively. By the change of tilt of the rotors, the pitch angle, the yaw angle, and the role angle of the helicopter 60 are adjusted.

Figure 7:
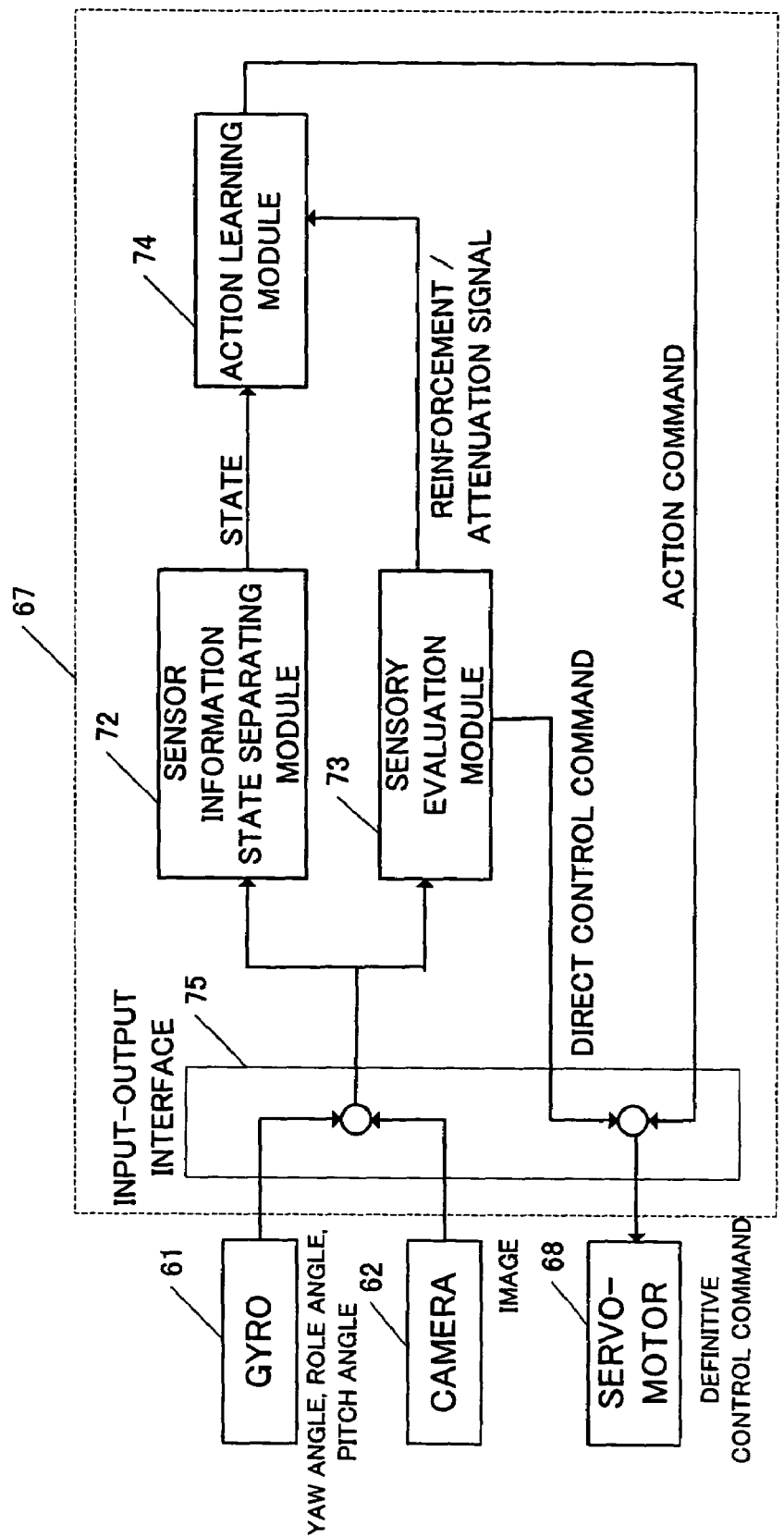
FIG. 7 is a block diagram showing a structure of a motor controller in FIG. 6.

FIG. 7 is a block diagram showing a structure of the motor controller 67 in further detail. The motor controller 67 comprises a sensor information state separating module 72, a sensory evaluation module 73, and an action learning module 74. The motor controller 67 can be realized by software such as a program, and hardware such as an analog circuit and a digital circuit. Further, the entire portion may be structured by the software or the hardware, or each of components may be individually structured by the software or the hardware and connected to each other to build a system.

The motor controller 67 obtains external information such as the pose information of the body 64 and the positional information of the target 63 by sensors such as the gyro 61 and the camera 62, respectively. The obtained information is classified into a plurality of circumstances by the sensor information state separating module 72. The classification can be performed according to the Self Organizing Map (SOM) of Kohonen, or the like. When the SOM is used, a map in which the sensor information is classified by similarity thereof is formed, and the sensor information is converted to low dimensioned states.

The sensory evaluation module 73 evaluates whether or not self-state thereof is unbalanced by the gyro 61 and the camera 62. For example, large vibration amplitude of a gyro output is an anxious factor, and if the information is not obtained from the camera (target is not acquired), this also becomes the anxious factor. The sensory evaluation module 73 outputs a reinforcement/attenuation signal capable of controlling the intensity of the learning (corresponding to the reinforcement signal ri(t) in FIGS. 1 and 2). For example, when the yaw angle, the role angle, or the pitch angle excesses a predetermined threshold (10 degree, for example), or when a change of the gyro output excesses a predetermined threshold because of a large vertical movement of the helicopter, the corresponding reinforcement/attenuation signal is set to a negative value. A local reinforcement/attenuation signal is required in each of the sensors. A sum of the local reinforcement/attenuation signals becomes the reinforcement/attenuation signal of the entire system.

The output of the sensory evaluation module 73 reinforces the learning of the action learning module 74, and directly controls the action output at an input-output interface 75. A direct control means, for example, a control such as attenuating the action output when the self-state thereof is unbalanced.

The action learning module 74 learns to choose an action according to an input condition, which is classified at the sensor information state separating module 72. In particular, the action in this embodiment is to choose output values to four channels at a control port of the four channels each corresponding to the vertical movement (ascent and descent), the yaw angle, the role angle, and the pitch angle of the helicopter body. The learning of choice of action progresses by the reinforcement/attenuation signal of the sensory-evaluation module 73.

In the action learning module 74, all learning is performed in the neural network using the suggested neural network element 10. The learning essentially progresses by the reinforcement learning. In other words, the system takes some action, and action is adjusted reflecting a result of the action. However, since the method of the conventional reinforcement signal such as the TD learning takes a lot of time in learning, the method is considered too difficult to be applied to learning in which a number of trials is limited such as helicopter controlling.

Actor-Critic structure suggested by Barto et al. was introduced as the neural network structure of the action learning module 74. In this structure, an Actor module learns the choice of action and a Critic module predicts the reinforcement signal to generate an internal reinforcement signal. The computational behavior of the model is known to correspond to neurophysiologic data obtained from the basal ganglia of the brain, which is a nerve center performing the action learning.

However, since implementation of Barto et al. formed by the TD learning model, this has the above-described problem that learning time thereof is long. So, the learning model was changed to the learning method of the neural network element 10 proposed in the present invention.

Figure 8:
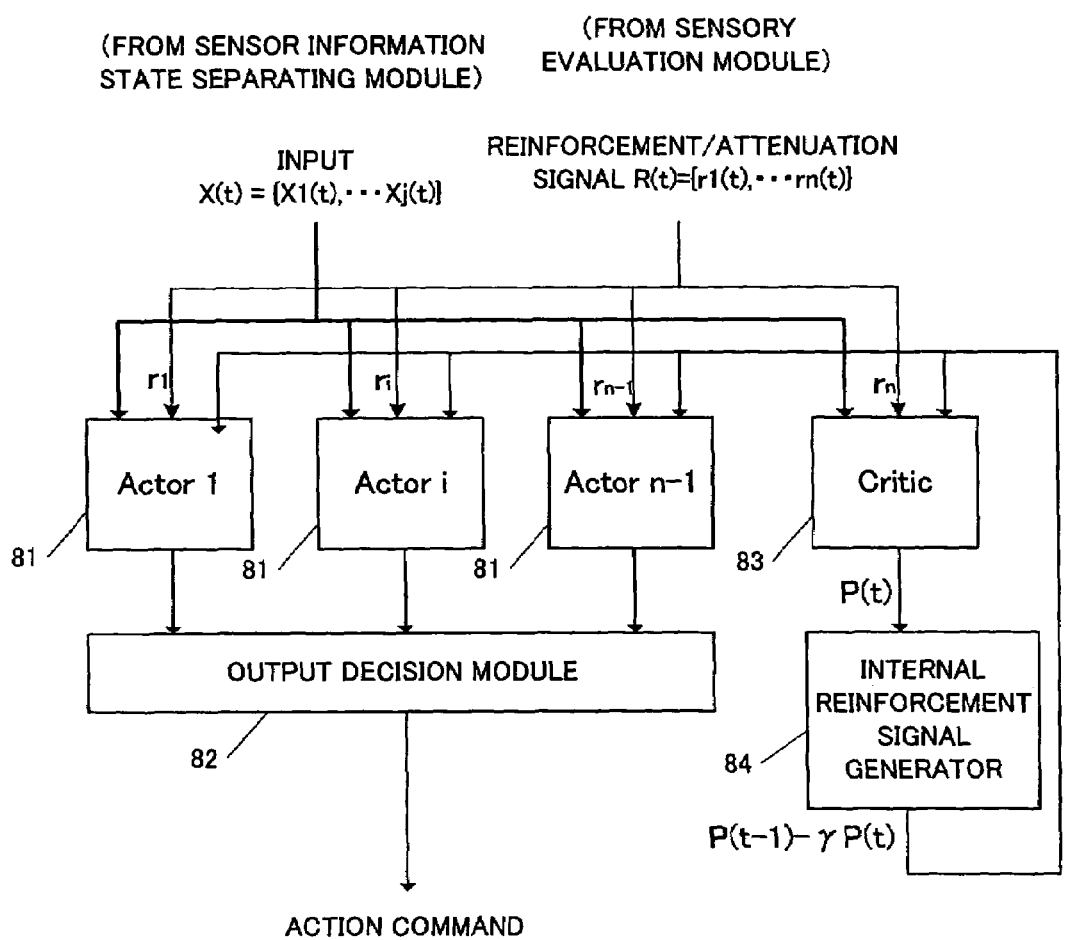
FIG. 8 is a block diagram showing a structure of an action learning module in FIG. 7.

FIG. 8 is a block diagram showing a structure of the action learning module 74 in further detail. The action learning module receives input vector $X(t)=\{X_1(t), \ldots, X_j(t)\}$ from the sensor information state separating module, and reinforcement/attenuation signal vector $R(t)=\{r_1(t), \ldots, r_n(t)\}$ from the sensory evaluation module. $X_j(t)$ represents a state classified at the above-described sensor information state separating module 63, and the subscript j represents the number of states. An assembly $X(t)$ of the states $X_i(t)$ becomes input to each of the neural network elements. $r_1(t)$ to $r_{n-1}(t)$ represent local reinforcement/attenuation signals obtained based on measurement value of each sensors. $r_n(t)$ represents a sum of the local reinforcement/attenuation signals, and is the reinforcement/attenuation signal of the entire system. Each of the local reinforcement/attenuation signals $r_1(t)$ to $r_{n-1}(t)$ is applied to the reinforcement learning of the Actor 1 to Actor n−1. The reinforcement/attenuation signal $r_n(t)$ of the entire system is applied to the learning of Critic.

The action learning module has as many Actors 81 as the local reinforcement/attenuation signals. Each of the Actors 81 outputs a local action command based on the input X(t). The action command in this embodiment is a control amount of a control port of a channel selected from the four channels each corresponding to the vertical movement (ascent and descent), the yaw angle, the role angle, and the pitch angle of the helicopter body. The local action commands output from each of the Actors 81 are compared to each other at an output decision module 82, and a definitive action command is output.

A Critic 83 predicts a future sum (predicted value) P(t) from time t of the reinforcement/attenuation signal $r_n$ regarding the entire system. Internal reinforcement signals P(t−1)−γP(t) is generated in an internal reinforcement signal generator 84 based on the predicted value P(t) output from the Critic 83. The internal reinforcement signal is sent to each of the Actors 81, and the learning is performed by the reinforcement signal which is a difference $(r_i(t)+\gamma P(t)-P(t-1)$ (i=1, 2, . . . , n−1)) between the reinforcement/attenuation signal and the internal reinforcement signal. Further, in the Critic, the learning is performed in the direction in which the difference $(r_n(t)+\gamma P(t)-P(t-1))$ between the reinforcement/attenuation signal and the internal reinforcement signal is reduced.

Figure 9:
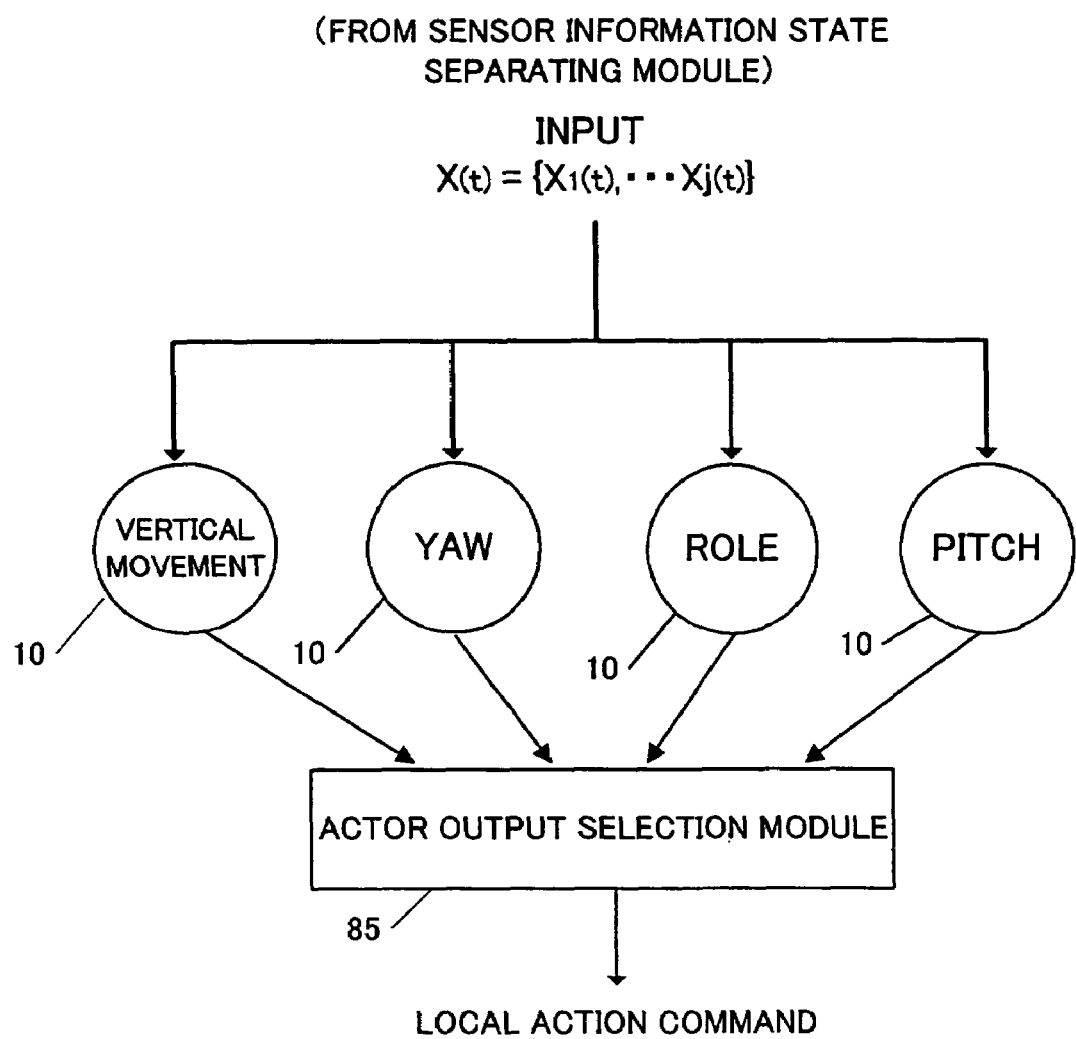
FIG. 9 is a block diagram showing an Actor in FIG. 8 to which the neural network element of the present invention is mounted.

FIG. 9 is a block diagram showing the Actor 81 of the action learning module 74 to which the neural network element 10 of the present invention is mounted. Each of the Actors 81 is formed by as many neural network elements as the output actions. In this embodiment, each of the neural network elements 10 corresponds to vertical movement control, yaw angle control, role angle control, and pitch angle control, respectively. Each of the elements sends output corresponding to the input X(t) to an Actor output select module 85. The Actor output select module 85 selects an action that outputs the maximum value and sends the same to the output decision module 82 as the local action command selected by the Actor.

The action learning module 65 is different from the conventional Actor-Critic structure in which the signal (reinforcement/attenuation signal) from the sensory evaluation module 64 is not common to all of the neural network elements, but differs for every plural Actors. When the yaw angle, the role angle, or the pitch angle excesses the predetermined threshold (10 degree, for example), or when the variation of the gyro output excesses the predetermined threshold because of the large vertical movement of the helicopter, the reinforcement/attenuation signals $r_1(t)$ to $r_{n-1}(t)$ give a negative value to the neural network element in the corresponding Actor. The reinforcement/attenuation signal may be generated by localization. For example, reinforcement/attenuation signals ($r_1(t)$ to $r_{n-1}(t)$) are generated by the Gaussian distribution having more than one peak at a dispersion axis regarding the yaw angle, the role angle, and the pitch angle. Further, $r_n(t)$ represents the reinforcement/attenuation signal decided based on the evaluation of the entire system. The reinforcement/attenuation signal $r_n(t)$ of the entire system gives a negative value to the Critic 83, when the image information from the camera stops. Such a configuration makes the portion to learn plural sorts of actions while having the action evaluation of the entire system.

While the reinforcement/attenuation signal is configured to be output from the sensory evaluation module 73 in the motor controller 67 in this embodiment, the reinforcement/attenuation signal according to predetermined criteria may be given from outside at every predetermined event.

2. Action Learning Control Device

2.1 Conventional Reinforcement Learning System

Figure 10:
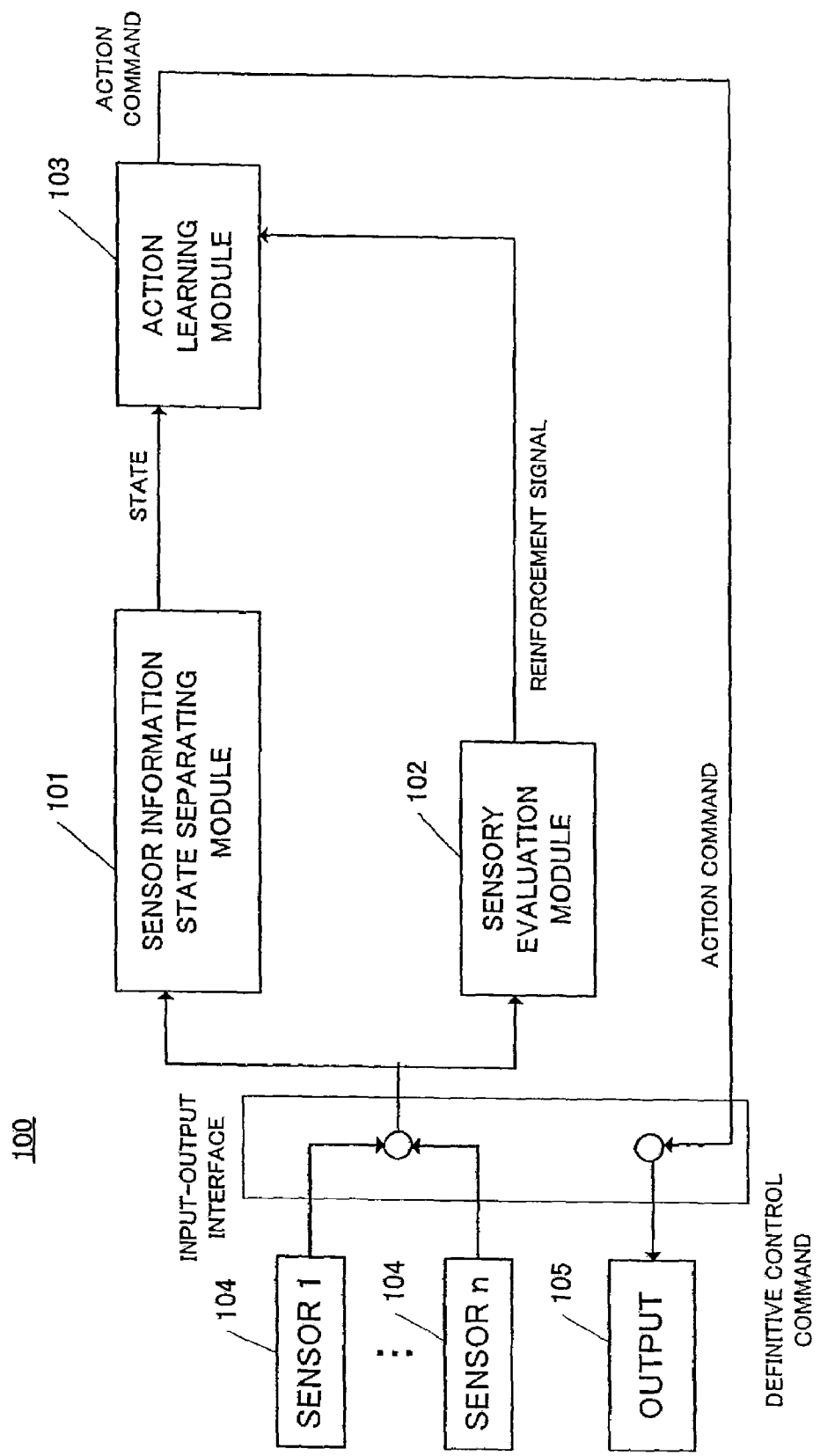
FIG. 10 is a block diagram showing a reinforcement learning system using the conventional Actor-Critic architecture.

FIG. 10 shows an example of a reinforcement learning system 100 using conventional Actor-Critic architecture. The system comprises a sensor information state separating module 101, a sensory evaluation module 102, and an action learning module 103.

In the system, information from external environment is obtained by a plurality of sensors 104. The obtained information is classified into some states at the sensor information state separating module 101 as an input signal. The classification can be performed according to the Self Organizing Map (SOM) of Kohonen, or the like. When the SOM is used, a map in which the sensor information is classified by similarity thereof is formed in a competitive layer, and the sensor information is converted into low dimensioned states.

The sensory evaluation module 102 evaluates a state of the system from the information of the sensor 104, and sends reward according to the same to the action learning module 103 as a reinforcement signal.

The action learning module 103 is structured by the Actor-Critic architecture, and learns to choose an action according to the state based on the input condition, which is classified at the sensor information state separating module 101. A selection learning of the action performs reinforcement learning based on the reinforcement signal from the sensory evaluation module 102.

Such conventional reinforcement learning system can effectively perform the learning in relatively simple domain, as described above. However, as the input and output become complicated, the system tends to fall into the local minimum, and it becomes difficult to find the best solution.

2.2 System Configuration

Figure 11:
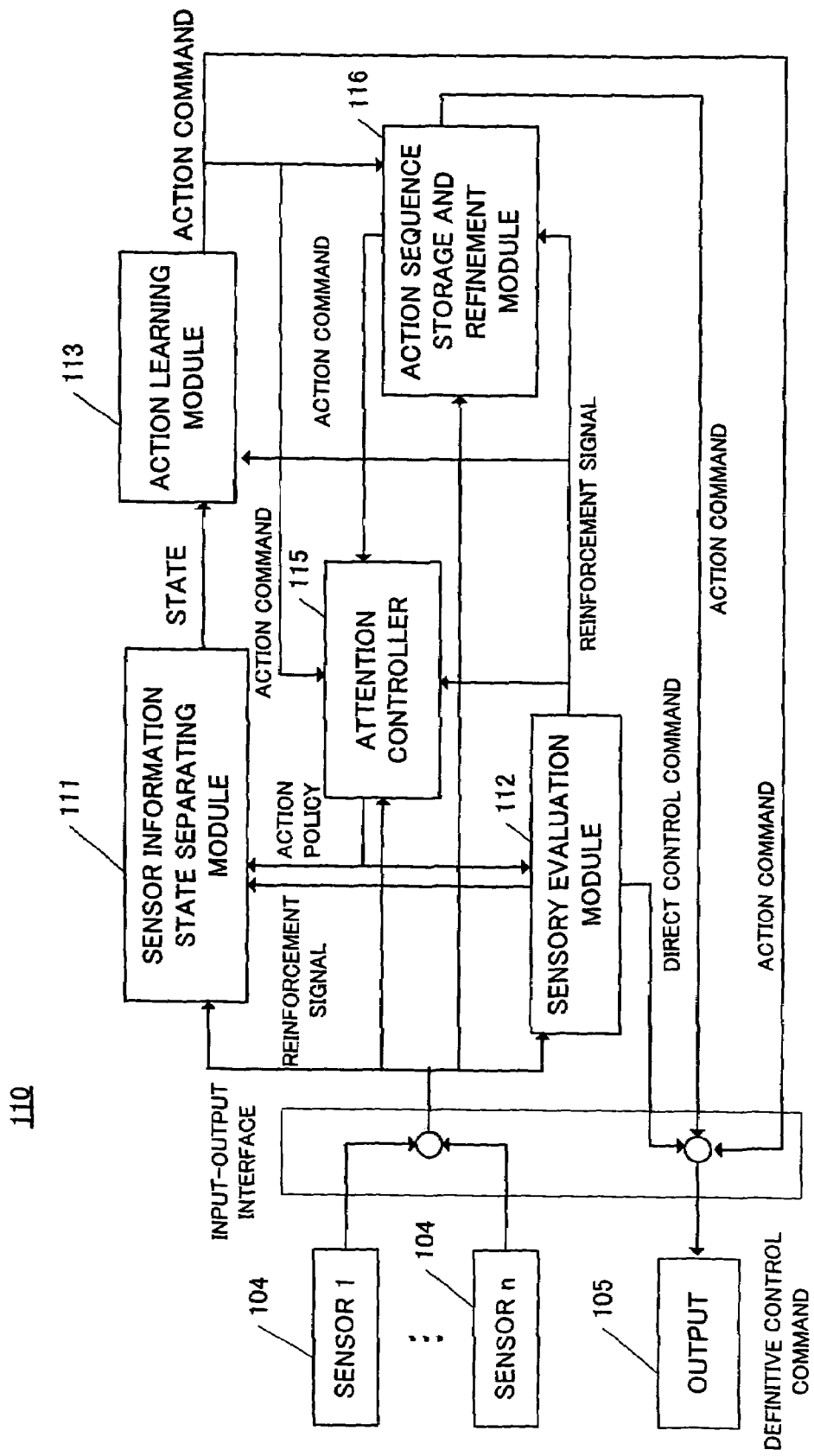
FIG. 11 is a block diagram showing a learning control system according to an embodiment of the present invention.

FIG. 11 is a block diagram showing a learning control system 110 in another embodiment of the present invention. The system is configured in view of high-level predictive performance and high-speed learning in comparison with the conventional reinforcement learning system 100 shown in FIG. 10. Among the components of the learning control system 110, a sensor information state separating module 111, a sensory evaluation portion 112, and an action learning module 113 are essentially similar to those in the conventional method shown in FIG. 10. The learning control system 110 is modified to further comprise, an attention controller 115 and an action sequence storage modification module 116, to introduce the reinforcement learning to the sensor information state separating module 111, and to output control by the sensor estimation module 112.

First, the attention controller 115 and the action sequence storage modification module 116, which are added, will be described.

2.2.1 Attention Control Module

The attention controller 115 provides a action policy which should be taken by the system to the sensor information state separating module 111 and the sensory evaluation module 112. Herein, the "action policy" is a kind of mode and is a short-term restriction to enable the target of the system to be achieved easily. The action policy may be predetermined or self-organizingly formed. In particular, the action policy is selected from a set of courses (if there are four courses, the set of courses is [Pa, Pb, Pc, Pd], for example) and sent to the sensor information state separating module 111 and the sensory evaluation module 112. State separation of the sensor information and generation of the reinforcement signal are changed according to a selected action policy.

The input signal to the attention controller 115 is selected from the information from the sensor 104, the reinforcement signal from the sensory evaluation module 112, the output action of the action learning module 113, and the action sequence storage modification module 116. The selection of the action policy from these inputs is described by a rule, for example. In this case, an order of selecting the action policy is preliminarily decided, and changed to next action policy according to the input signal.

The selected action policy is continued until the target is achieved. However, in an unpredictable circumstance, the action policy is often reset judging from the reinforcement signal from the sensory evaluation module 112, and changed to the action control process to be described later in paragraph 2.2.4., by the sensory evaluation module 112.

The action policy selected at the attention controller 115 is sent to the sensor information state separating module 111 and the sensory evaluation module 112. In the sensor estimation module 112, the reinforcement signal is generated by using a set of functions according to the action policy. In other words, different reinforcement signal may be generated from the same sensor information according to the given action policy. Further, in the sensor information state separating module 111, the action policy is applied to the learning.

2.2.2 Action Sequence Storage and Refinement Module

An action sequence storage and refinement module 116 stores temporal information of a state and action contributing to acquire reward, and outputs the action from stored temporal information when a state and action similar to the stored state and action occur. While the conventional reinforcement learning is capable of learning the temporal information at the time of discovery, it is hard to stably keep and modify the same to improve accuracy. Then, the module 116 is introduced to output with priority the past temporal relationship contributing to the reward. Thereby, output calculation becomes simplified to enable a high-speed process, and flexibility of the learning is restricted by narrowing a predicted domain, to cope with complicated circumstances.

The input to the module 116 is selected from the information from the sensor 104, output action of the action learning module 113, and the reinforcement signal from the sensory evaluation module 112. The information from the sensor 104 is "state", the output from the action learning module 113 is "action", and the reinforcement signal is "reward". Comparison with the stored temporal information can be performed by collating the temporal information up to past some steps including the input actual state and action with the stored temporal information, and outputting the temporal action from the collated point when the information corresponds to the stored data.

2.2.3 Introduction of Reinforcement Learning to Sensor Information State Separating Module Next, an introduction of the reinforcement learning to the sensor information state separating module 111 will be described. In an embodiment of the present invention, the reinforcement signal from the sensory evaluation module 112 and the action policy from the attention controller 115 are added to the conventional sensor information as an input to the sensor information state separating module 111 to promote classification learning of the information from the sensor 104.

As described above, in the sensor information state separating module 111, a map of the low dimensioned states of the sensor information from a plurality of sensors 104 is self-organizingly formed by the SOM or the like. However, when there is a lot of variety of the sensors 104, a rule for classification such as importance of each of the sensors becomes difficult to be decided. By introducing the reinforcement learning, the sensor information, which is deeply concerned with the output result, is easily selected, thereby enable to learn an effective classification of state. By receiving the action policy from the attention controller 115, the sensor information that is deeply concerned with achievement of the target of the system is easily selected, and a map is formed.

In this embodiment, the action policy is used, in addition to the sensor information, as the input signal of the sensor information state separating module 111. By using the action policy as the input signal, a mapping regarding a combination of the sensor information and the action policy becomes possible. In other words, different states according to the action policy are expressed with same sensor information pattern. The action policy is input in a manner in which the selected action policy is 1 and the other action policy is 0, for example.

Each component of the input signals is input to a corresponding neuron in an input layer. Each neuron in a competitive layer is totally coupled to the neuron in the input layer, and a coupling weight there between and Euclidean distance between the neurons and the input signal are calculated. The neuron having the shortest Euclidean distance wins the competition and the coupling weight of the same including the neurons in the vicinity is updated. The reinforcement signal from the sensory evaluation module 112 reinforces the mapping by adjusting update speed of the coupling weight.

The neuron for neural network (hereinafter, referred to as a neural network element) 10 characterized by ability of high-speed temporal information learning, which is described with formulae 1 to 5 in reference to FIGS. 1 and 2 is preferably applied to the neuron of the sensor information state separating module 111.

The conventional neuron, which does not have the history, is also applicable to the neuron of the sensor information state separating module 111. In this case, effective learning is realized by increasing or decreasing a learning coefficient according to the reinforcement signal when the coupling weight is updated.

2.2.4 Output Control by Sensory Evaluation Module

Next, output control by the sensory evaluation module 112 will be described. The sensory evaluation module 112 outputs a command to inhibit the action output, when this judges that the system fails in achieving the target. When the system is actually controlled by the learning, it definitely is highly possible that the system action fails in the beginning of the learning. Since the system does not have enough knowledge yet, this may repeat a mistake. Therefore, the module is configured to inhibit the action output and output a command to restrict the action when this evaluates that the system fails. Thereby, the learning of less-effective action after the mistake is inhibited to perform more trials in a short time by eliminating useless learning.

2.2.5 System Configuration Depending on Output

The learning control system is characterized by the system configuration depending on the output. While there is the reinforcement learning as a method of autonomous action learning, the learning is difficult unless an action region to be learned is narrow. For this reason, there is not a basal learning principal in a research of a hierarchical structure. In the learning control system in an embodiment of the present invention, the learning is performed so as to integrate the system based on the output 105. That is, when the output 105 is fixed, the learning of the action and that of the sensor information are independently performed by using the information stored as the history, and the system is further updated by a resulting output. By providing the learning control system with a different learning module shown in FIG. 11, a hierarchical process according to architecture thereof is consequently formed.

2.3 Application to Motor Control of Helicopter

Next, a motor control system of a radio-controlled helicopter applying the above-described learning control system 110 will be explained. It is considered that the conventional method of reinforcement learning is very difficult to be applied to learning such as helicopter control in which the number of trials is limited, because of a problem that the learning takes a long time. On the other hand, the learning control system suggested in the present invention is characterized by a high predictive ability thereof and high-speed learning. Therefore, the present invention is capable of coping with the learning such as helicopter controlling that has only a few times of.

2.3.1 System Configuration

An entire configuration of the motor control system of the radio-controlled helicopter in this embodiment is similar to that of the above-described embodiment shown in FIG. 6. A motor controller 67 is different from that of the above-described embodiment as described later.

The system controls an autonomous flight of the helicopter such as hovering based on the position information of the target 63 by the camera 62, and the pose information of the body 64 by the gyro 61.

The helicopter 60, which is the target to be controlled, comprises the body 64, the main rotor 65, and the tail rotor 66. The helicopter 60 levitates by rotation of the main rotor 65 and the tail rotor 66.

The gyro 61, the camera 62, the motor controller 67, and the servomotor 68 are mounted to the body 64. The gyro 61 detects the pitch angle, the yaw angle and the role angle of the body 64, and the camera 62 provides the image of the target 63, which serves as the marker of the autonomous flight of the helicopter 60. The information from the gyro 61 and the camera 62 is input to the motor controller 67. The extensible structure 69 and the linkage 70 are provided on the base portion of the main rotor 65 and that of the tail rotor 66, respectively, which are connected to the servomotor 68 by the rod 71 or the like. When the output from the servomotor 68 changes according to the command value from the motor controller 67, tilt of the main rotor 65 and of the tail rotor 66 also change by the extensible structure 69 and the linkage 70, respectively. By the change of tilt of the rotors, the pitch angle, the yaw angle, and the role angle of the helicopter 60 are adjusted.

Figure 12:
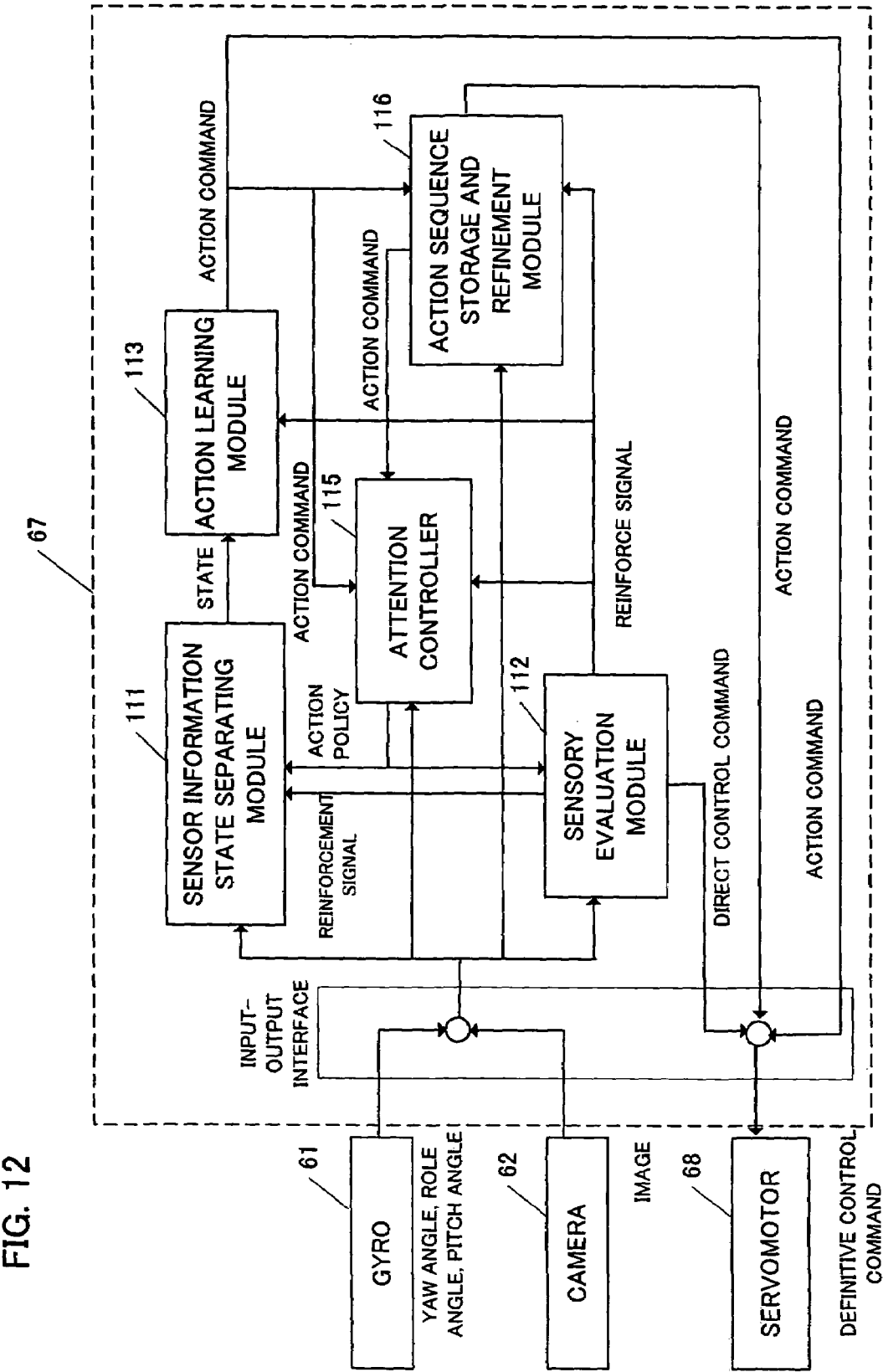
FIG. 12 is a block diagram showing a structure of a motor controller of a learning control system of helicopter according to another embodiment of the present invention.

FIG. 12 is a block diagram showing a structure of the motor controller 67 in this embodiment. The motor controller 67 comprises the sensor information state separating module 111, the sensory evaluation module 112, the action learning module 113, the attention controller 115, and the action sequence storage modification module 116, as the learning control system 110 described in reference to FIG. 11. The motor controller 67 can be realized by the software such as the program and the hardware such as the analog circuit and the digital circuit. Further, the entire portion may be structured by the software or the hardware, or each of the components may be individually structured by the software or the hardware and connected to each other to build the system.

The motor controller 67 obtains the yaw angle, the role angle and the pitch angle by the gyro 61, and blob information and template positional information by the image of the camera 62, as the sensor information from the external environment.

Herein, the blob information is information of position and area of a region having constant lightness extracted from the image of the camera. The image of camera is multivalued into images having multiple lightness stages according to a color contrast threshold, and area of all blobs and a center position coordinate of the blob in each lightness image are stored as the blob information.

Template positional information is information of position most similar to a shape of a template at a periphery of each of the blobs. The templates in this embodiment are in two shapes of large and small targets 63, and are used separately according to flight altitude. Template matching is performed at the periphery of each of the blobs, and the position coordinate indicating the highest matching value in every blob and the matching value thereof are obtained. The data having high matching value is stored as the template positional information from these data.

The action output is applied voltage to the servomotor 68 coping with the vertical movement, yaw angle control, role angle control, and pitch angle control of the body 64. In this embodiment, the servomotor 68 is connected to the extensible structure 69 and the linkage 70. Tilt of the main rotor 65 and that of the tail rotor 66 changes by driving of the servomotor 68, and position of the helicopter body 64 consequently changes, too.

To simplify the learning, the action output from the system (applied voltage) is not a continuous value, but is classified to a plurality of discrete steps according to an angle of the rotor 65. For example, when the action is classified into nine steps from action 0 to action 8, action 4 is a state in which the main rotor 65 is horizontal with the body, and the rotor 65 tilts forward as the action is closer to action 0, and tilts backward as the action is closer to action 8.

2.3.2 Selection of Action Policy in Attention Controller

In the attention controller 115, when a certain action policy is selected based on the input signal, a target state of the system is defined to decide a target of the action. A method of selecting the action policy may be preliminarily given or discovered by research. When the method is discovered by the research, this is learned by the reinforcement signal from the sensory evaluation module. In this embodiment, the action policy is an operation command of the aircraft pitch angle from a pilot. Further, the target state is a state acceptable by the action policy to be selected.

When the action policy is preliminarily set, the courses of action such as "takeoff", "hovering", "tracking", and "landing", for example, are set in this embodiment.

Order of selection of these courses of action is predetermined. In this embodiment, these are selected in the order of "takeoff", "hovering", "tracking", and "landing". Transition to next action policy is judged by the input signal. For example, the transition from "takeoff" to "hovering" is decided when "hovering" obtains reinforcement signal larger than that of "takeoff", and rotation speed of the main rotor is higher than a predetermined value capable of stable hovering. Further, the transition from "hovering" to "tracking" is performed when action of past few steps is stable in addition to the above-described condition of the reinforcement signal condition.

2.3.3 Generation of Reinforcement Signal at Sensory Evaluation Module

The sensory evaluation module 112 generates the reinforcement signal based on the sensor information such as the gyro 61 and the camera 62, by using a set of functions according to the action policy. That is, different reinforcement signal may be generated from the same input information if the action policy is different. The following chart shows an example of the set of functions according to the action policy.

TABLE 1

| ACTION POLICY SENSORY EVALUATION | TAKEOFF | HOVERLING | TRACKING | LANDING | REMARKS |
|---|---|---|---|---|---|
| ROTATIONAL OF MAIN ROTOR [ψ] | $r_\psi = \rho_a \psi$ | $r_\psi = \rho_b \psi$ | $r_\psi = \rho_c \psi$ | $r_\psi = \rho_d \psi$ | $\rho_a > \rho_c > \rho_b > \rho_d \geqq 0$ |
| YAW ANGLE γ, $\|\gamma\| > k_\gamma$ | $r_{G\gamma} = \Delta a$ | $r_{G\gamma} = \Delta b$ | $r_{G\gamma} = \Delta c$ | $r_{G\gamma} = \Delta d$ | $\Delta a = \Delta d < \Delta b < \Delta c < 0$ |
| ROLE ANGLE ψ, $\|\psi\| > k_\psi$ | $r_{G\psi} = \Delta a$ | $r_{G\psi} = \Delta b$ | $r_{G\psi} = \Delta c$ | $r_{G\psi} = \Delta d$ | $\Delta a = \Delta d < \Delta b < \Delta c < 0$ |

TABLE 1-continued

| ACTION POLICY SENSORY EVALUATION | TAKEOFF | HOVERLING | TRACKING | LANDING | REMARKS |
|---|---|---|---|---|---|
| PITCH ANGLE θ, \|θ\| > $k_θ$ | $r_{Gθ} = Δa$ | $r_{Gθ} = Δb$ | $r_{Gθ} = Δc$ | $r_{Gθ} = Δd$ | $Δa = Δd < Δb < Δc < 0$ |
| NUMBER OF BLOB [b] | $b = 0 → r_b = 0$ $b > 0 → r_b = 0$ | $b = 0 → r_b = -1$ $b > 0 → r_b = 0$ | $b = 0 → r_b = -1$ $b = 1 → r_b = δ_b$ $b ≧ 2 → r_b = 0$ | $b = 0 → r_b = 0$ $b > 0 → r_b = 0$ | $δ_b > 0$ |
| POSITIONAL INFORMATION OF TARGET [tx, ty] | $r_t = 0$ | $Δtx < Tb, Δty < Tb$ $→ r_t = δ_t$ | $Δtx < Tc, Δty < Tc$ $→ r_t = δ_t$ | $r_t = 0$ | $δ_t > 0$ $Tb > Tc$ |

A reinforcement signal $r_ψ$ is obtained by multiplying a rotational speed Ψ by a coefficient ρ. Value of the coefficient ρ varies according to the course action, and this becomes smaller in the order of "takeoff", "tracking", "hovering", and "landing". In other words, the rotational speed of the main rotor 65 provides the largest reward in the time of "takeoff" to largely affect to the action of the system. On the other hand, an effect to the system is smallest in the time of "landing".

Negative value is given to reinforcement signals $r_{Gγ}$, $r_{GΔ}$, and $r_{Gθ}$ by the yaw angle, the role angle, and the pitch angle, respectively when the angles excess predetermined values $k_γ$, $k_A$, and $k_θ$ (10 degree, for example). This setting is to keep the helicopter in a constant pose. The value of given reinforcement signal is largest when taking off and landing, and is most close to 0 when tracking. That is, since more stable pose is required when taking off and landing, variation of pose of the aircraft, largely affects the system.

A predetermined value is given to a reinforcement signal $r_b$ by the blob information, according to a number of blobs. When tracking, if the number of the blob detected in the image of the camera 62 is one, a predetermined value $δ_b$ is given, if the number of the blobs is two or more, the reinforcement signal is 0, and if there is no blob, the reinforcement signal is −1. Since a tracking mode is a task in which the target 63 is acquired to stabilize a flight attitude, it is required to correctly identify the target. Therefore, the evaluation is the highest when there is one blob, and the lowest when there is no blob. On the other hand, when hovering, the evaluation is the lowest when no blob is detected, and, when the blob is detected, certain evaluation is given irrespective of the number thereof. This is because when hovering, a target to be controlled is not necessarily restricted to the target 63 and certain image information of object is enough to keep the flight attitude. Further when taking off and landing, the reinforcement signal by the blob information is not considered.

A predetermined value $δ_t$ is given to the reinforcement signal $r_t$ by the positional information of the target 63, if a position of the target 63 falls in a certain range compared to a previous frame. When hovering, absolute difference (that is, $Δx=|tx(t)−tx(t−1)|$, $Δy=|ty(t)−ty(t−1)|$) between the target position and the previous frame is obtained, and if Δx and Δy are smaller than a threshold Tb, the reinforcement signal $r_t$ satisfies $r_t=δ_t$. Also when tracking, if Δx and Δy are smaller than a threshold Tc, the reinforcement signal $r_t$ satisfies $r_t=δ_t$. Herein, $δ_t$ and Tb satisfy $δt>0$ and Tb>Tc, respectively. That is, higher accuracy is required in the tracking mode regarding the stability of the flight attitude, so that a condition of acquiring the reward is more difficult. Further, when taking off and landing, the reinforcement signal by the positional information of the target 63 is not considered.

Hereinbefore, the method of generating the reinforcement signal based on each sensor information was described. In these reinforcement signals, the reinforcement signal $r_ψ$ by the rotational speed of the main rotor, and the reinforcement signals $r_{Gγ}$, $r_{Gψ}$, and $r_{Gθ}$ of the yaw angle, the role angle, and the pitch angle, respectively are sent to the action learning module 113 as local reinforcement signals $r_1$ to $r_{n−1}$. Further, a sum of these local reinforcement signals, the reinforcement signal $r_b$ by the blob information, and the reinforcement signal $r_t$ by the positional information of the target becomes the reinforcement signal $r_n$ of the entire system.

2.3.4 Configuration of Action Learning Module

As described above, the plural reinforcement signals are generated based on the plural sensor information at the sensory evaluation module 112. Each of the plural reinforcement signals generated is based on the local information. In this embodiment, it is possible to advance the action learning of the complex control target such as the helicopter in a proper direction by performing the action learning in every local reinforcement signal.

A configuration of the action learning module 112 is similar to that of the action learning module 74 in above-described another embodiment. Regarding a principle of action of the action learning module 112, refer to FIGS. 8 and 9, and section 1.2.

The neural network element capable of temporal learning described in the formulae 1 to 5 is preferably applicable to the neuron of the action learning module 112. However, the conventional neuron, which does not have the history, may also be applicable.

2.3.5 Result of Experiment

Figure 13:
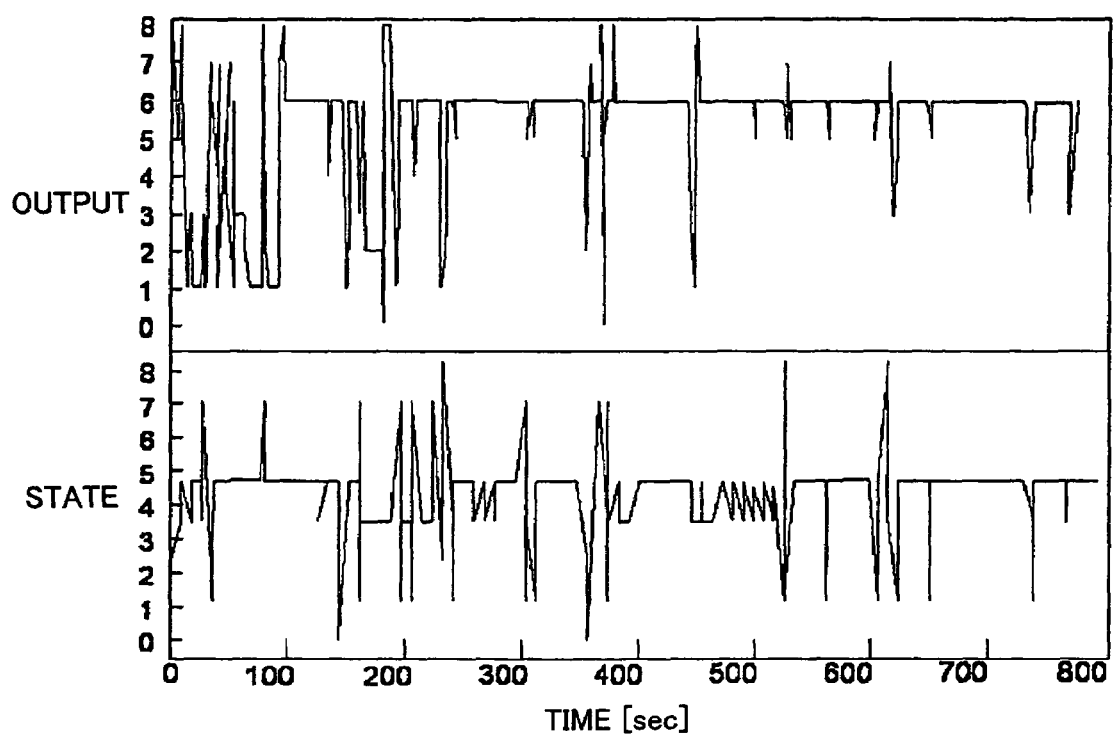
FIG. 13 is a chart showing an experiment result of the learning control system of helicopter.

FIG. 13 is a chart showing an experiment result of progress of learning when a constant action target (attitude of the pitch angle) was given to the system. Abscissa axis is a time axis representing from 0 second to 800 seconds. Upper portion of longitudinal axis represents output control command and is classified into nine steps from action 0 to action 8. Lower portion of the longitudinal axis represents a state, which is separated at the sensor information state separating module, and in this case, the number of state is nine.

The control command and the state change largely until about 200 seconds have past to transition to a variety of actions and states. This may be because the learning progresses exploratory because the input-output relationship is not stable yet and the state is not perfectly separated yet in the beginning of the learning.

On the other hand, as the elapsed time is closer to 800 seconds, the transition of the action and the state is reduced, and, the control command and the state are stabilized in action 6 and state 5, respectively. It is found that the stability of the action and that of the state progress by mutually interacting.

While the reinforcement signal is configured to be output from the sensory evaluation module 112 in the motor controller 67 in this embodiment as shown in FIG. 13, the reinforcement signal according to the predetermined criteria may be given from outside each time a predetermined event occurs.

What is claimed is:

1. An action learning control system capable of learning an input-output relationship according to own action of the system, comprising:

a sensor configured to obtain information from an external environment and to output the obtained information;

a sensory evaluation module configured to receive information from the sensor to receive an action policy, to determine whether a state of a controlled object is stable or not based on the received information, and to output a reinforcement signal according to the determined result;

a sensor information state separating module for performing reinforcement learning, configured to receive information from the sensor, to receive the reinforcement signal from the sensory evaluation module, to receive the action policy, to give heavier weight to sensor information having higher sensory evaluation, to classify sensor information into a low-dimensional state, and to output the state;

an action learning module, configured to receive the state from the sensor information state separating module and to output a corresponding action control command, for learning a relationship between the state and the action control command;

an attention controller configured to receive information from the sensor, to receive the reinforcement signal from the sensory evaluation module, to receive the action control command from the action learning module, and to send the action policy to the sensory evaluation module and to the sensor information state separating module;

an action sequence storing and refining module configured to receive information from the sensor, to receive the reinforcement signal from the sensory evaluation module, to receive the action control command from the action learning module, to determine a refined action control command based on the received sensor information and based on the received action control command and based on stored temporal information, and to output the refined action control command; and an output module configured to receive the refined action control command from the action sequence storing and refining module and to output the refined action control command.

2. The action learning control system according to claim 1, wherein the sensory evaluation module is further configured to output a command to inhibit an action control command output from the system when the sensory evaluation module judges a state of the controlled object is unstable.

3. A computer-implemented method of determining an action control command using reinforcement learning, comprising:

obtaining information from an external environment using one or more sensors;

determining whether a state of a controlled object is stable or not based on information from the sensors;

outputting a reinforcement signal according to the stability determination;

generating an action policy;

adjusting the state separation and the reinforcement signal generation based on the action policy;

performing reinforcement learning based on the reinforcement signal, comprising:

giving heavier weight to sensor information having higher sensory evaluation; and classifying sensor information into a low-dimensioned state;

learning a relationship between the classified state and a corresponding action control command based on the reinforcement signal;

outputting a first action control command;

storing and modifying an action sequence;

determining a second action control command based on the obtained sensor information and based on the first action control command and based on stored temporal information; and outputting the second action control command.

* * * * *